(12) United States Patent
Reany et al.

(10) Patent No.: US 8,714,476 B2
(45) Date of Patent: May 6, 2014

(54) AIRCRAFT WING WITH FLEXIBLE SKINS

(75) Inventors: Jack W. Reany, Corona de Tucson, AZ (US); Terry M. Sanderson, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 137 days.

(21) Appl. No.: 13/278,493

(22) Filed: Oct. 21, 2011

(65) Prior Publication Data

US 2013/0099049 A1   Apr. 25, 2013

(51) Int. Cl.
*B64C 3/38* (2006.01)
(52) U.S. Cl.
USPC .. 244/46; 244/123.1; 244/123.8; 244/123.11; 244/123.14; 244/210
(58) Field of Classification Search
USPC ............... 244/123.1, 123.8, 123.11, 123.14, 244/210–217, 219, 218, 87
See application file for complete search history.

(56) References Cited

U.S. PATENT DOCUMENTS

| | | | | |
|---|---|---|---|---|
| 2,125,064 A * | 7/1938 | Burgess | ........................ | 244/219 |
| 3,994,452 A * | 11/1976 | Cole | ........................... | 244/214 |
| 4,200,253 A * | 4/1980 | Rowarth | .................... | 244/219 |
| 4,247,066 A * | 1/1981 | Frost et al. | ................ | 244/219 |
| 4,351,502 A * | 9/1982 | Statkus | ........................ | 244/219 |
| 5,150,864 A * | 9/1992 | Roglin et al. | ................ | 244/219 |
| 6,276,641 B1 * | 8/2001 | Gruenewald et al. | ......... | 244/213 |
| 6,905,093 B2 * | 6/2005 | Dryer et al. | ................. | 244/3.28 |
| 7,017,237 B2 * | 3/2006 | Magno et al. | ............... | 24/16 PB |
| 7,384,016 B2 * | 6/2008 | Kota et al. | ................... | 244/123.1 |
| 7,642,492 B2 * | 1/2010 | Parine et al. | ................. | 244/3.27 |
| 7,728,267 B2 * | 6/2010 | Sanderson et al. | ........... | 244/3.27 |
| 7,878,459 B2 * | 2/2011 | Mabe et al. | .................... | 244/213 |
| 7,939,178 B2 * | 5/2011 | Sar et al. | ....................... | 428/591 |
| 8,056,853 B2 * | 11/2011 | Eisentraut et al. | .............. | 244/46 |
| 8,162,607 B2 * | 4/2012 | Grohmann et al. | ............. | 416/23 |
| 8,367,993 B2 * | 2/2013 | Velez et al. | ................... | 244/3.28 |
| 8,382,045 B2 * | 2/2013 | Manley et al. | ................ | 244/219 |
| 8,418,968 B2 * | 4/2013 | Grip | ............................. | 244/219 |
| 2006/0157623 A1 * | 7/2006 | Voglsinger et al. | ........... | 244/219 |
| 2006/0163423 A1 | 7/2006 | Parine et al. | | |
| 2007/0152106 A9 * | 7/2007 | Perez-Sanchez | ............. | 244/219 |
| 2009/0283643 A1 | 11/2009 | Sar et al. | | |
| 2009/0283936 A1 | 11/2009 | Sanderson et al. | | |
| 2010/0127130 A1 | 5/2010 | Eisentraut et al. | | |
| 2010/0237192 A1 * | 9/2010 | Sanderson et al. | ....... | 244/123.11 |
| 2010/0288870 A1 | 11/2010 | Geswender et al. | | |
| 2011/0017876 A1 * | 1/2011 | Manley et al. | ................. | 244/219 |
| 2012/0048993 A1 * | 3/2012 | Velez | ........................... | 244/3.28 |

OTHER PUBLICATIONS

Application as filed from related U.S. Appl. No. 12/843,921, filed Jul. 27, 2010.

* cited by examiner

*Primary Examiner* — Isam Alsomiri
*Assistant Examiner* — Assres H Woldemaryam
(74) *Attorney, Agent, or Firm* — Renner, Otto, Boisselle & Sklar, LLP

(57) ABSTRACT

A wing includes a spar, and a pair of flexible skins that are attached to the spar. The spar is at the leading edge of the wing, and the skins extend toward the trailing edge of the wing. The wing deploys from a stowed condition, in which the skins are curved in the same direction around a fuselage of an aircraft, to a deployed condition, in which the skins provide the wing with an airfoil cross-sectional shape, for example with the skins curve in opposite direction. A lock is used to maintain the skins in the deployed state, with the lock for example located at the trailing edge of the wing. The lock may be a mechanical mechanism that automatically locks the wing in the deployed state, preventing the wing from returning to the stowed state.

19 Claims, 5 Drawing Sheets

AIRCRAFT WING WITH FLEXIBLE SKINS

BACKGROUND OF THE INVENTION

1. Field of the Invention

The invention is in the field of deployable wings, and in aircraft having deployable wings.

2. Description of the Related Art

Aircraft launched from tubes or other devices may be severely limited in wing size and/or configuration, because of the need for the wings to fit within the launcher envelope. This limitation on wings limits the performance of tube-launched or other deployable aircraft. Improvement in deployable wings would therefore be desirable.

SUMMARY OF THE INVENTION

According to an aspect of the invention, a wing has flexible upper and lower skins, allowing for the wing to change shape from a stowed configuration to a deployed configuration.

According to another aspect of the invention, a wing has a pair of flexible skins attached to a spar that is at a leading edge of the wing.

According to still another aspect of the invention, a wing has a pair of flexible skins that may be locked together when the wing has moved from a stowed state to a deployed state.

According to yet another aspect of the invention, a wing has a pair of flexible skins that are curved in the same direction when the wing is in a stowed state, and are curved in opposite directions when the wing is in a deployed state.

According to still another aspect of the invention, a wing includes: a pair of flexible skins; and a lock. The skin portions each have a first end and a second end opposite the first end. The first ends are spatially separated from one another by a gap. The lock is able to selectively lock the skin portions together at a location that is closer to the second ends than it is to the first ends.

According to a further aspect of the invention, an aircraft includes: a fuselage; and wings operatively coupled to the fuselage. The aircraft may be launched, such as from a launcher, such as a tube, with the wings in a stowed state, with each of the wings wrapped partially around the fuselage, with flexible skins of the wings curved around the fuselage. The wings deploy in flight to a deployed state, with the flexible skins reconfigured from the stowed state.

According to a still further aspect of the invention, a method of deploying an aircraft includes: launching the aircraft, such as from a launcher, such as a tube, wherein wings of the aircraft are in a stowed state during launch; and after the launching and during flight, deploying the wings from the stowed state to a deployed state, wherein the deploying includes, for each of the wings changing relative position of a pair of flexible skins of the wing.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The annexed drawings, which are not necessarily to scale, show various aspects of the invention.

DETAILED DESCRIPTION

A wing includes a spar, and a pair of flexible skins that are attached to the spar. The spar is at the leading edge of the wing, and the skins extend toward the trailing edge of the wing. The wing deploys from a stowed condition, in which the skins are curved in the same direction around a fuselage of an aircraft, to a deployed condition, in which the skins provide the wing with an airfoil cross-sectional shape, for example with the skins curve in opposite direction. A lock is used to maintain the skins in the deployed state, with the lock for example located at the trailing edge of the wing. The lock may be a mechanical mechanism that automatically locks the wing in the deployed state, preventing the wing from returning to the stowed state. The wing may have fold-out ribs that add stiffness to the wing when the wing is in the deployed state. The wing's ability to stow compactly against the fuselage enables more efficient use of space for aircraft, such as unmanned aerial vehicles, that are launched from tubes or other launchers.

Figure 1:
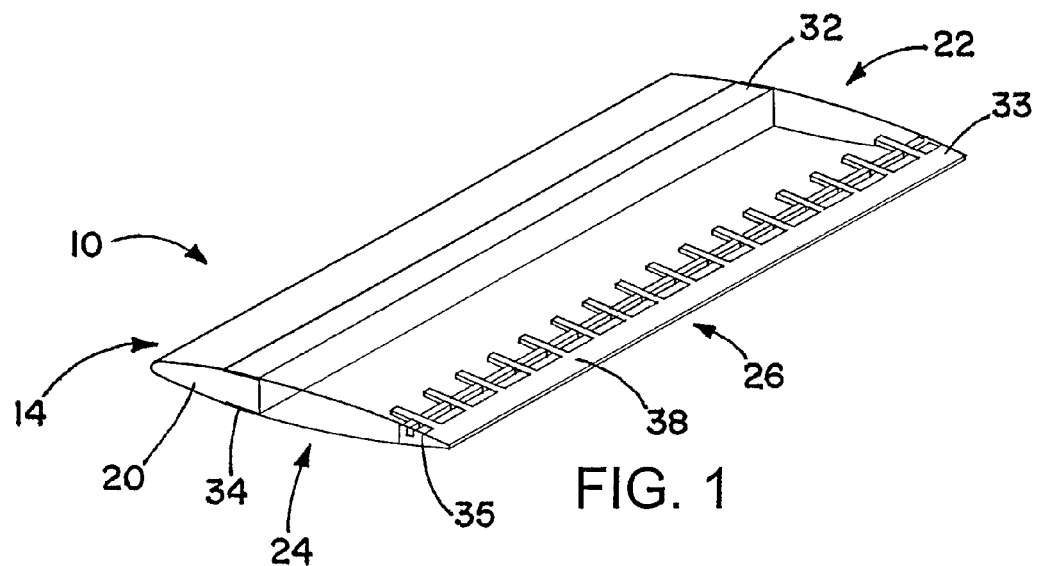
FIG. 1 is an oblique view of a wing in accordance with an embodiment of the invention.

FIG. 1 shows a wing 10 that includes a spar 12 at a leading edge 14 of the wing 10, and a pair of flexible skins 22 and 24 that are connected to the top and bottom of the spar 12. The top skin 22 forms the top surface of the wing 10, from the spar 12 substantially all the way to a trailing edge 26 of the wing 10. The bottom skin 24 forms the bottom surface of the wing 10, from the spar 12 substantially all the way to the trailing edge 26. The top skin 22 has a first end 32 that is attached to the spar 12, and a second end 33 that is at the trailing edge 26.

The bottom skin 24 has a first end 34 that is attached to the spar 12, and a second end 35 that is at the trailing edge 26. The connections of the skins 22 and 24 to the spar 12 may be through use of suitable fasteners, such as rivets, or by bonding.

A lock 38 is located at the trailing edge 26 of the wing 10, used for locking together parts of the skins 22 and 24, in order to maintain the wing 10 in a deployed state once the wing is deployed from a stowed state. The lock 38 may lock together second ends 33 and 35 of the skins 22 and 24, or alternatively may lock together other parts of the skins 22 and 24. The lock 38 may be a one-way lock, mechanically locking the skins 22 and 24 during reconfiguration of the wing in one direction (from a stowed state to a deployed state), so as to prevent reconfiguration in the opposite direction.

Figure 2:
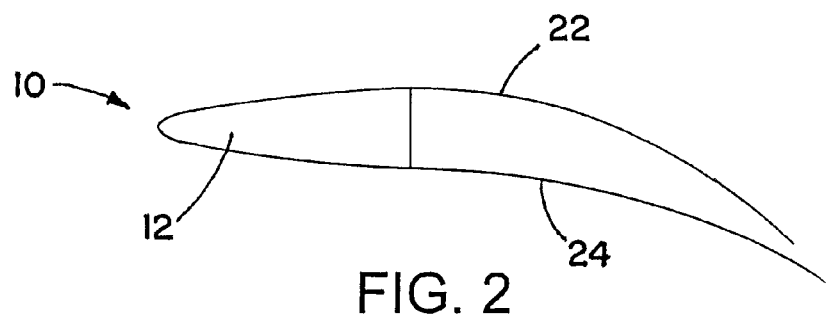
FIG. 2 is a cross-sectional view of the wing of FIG. 1, in a stowed state.
Figure 3:
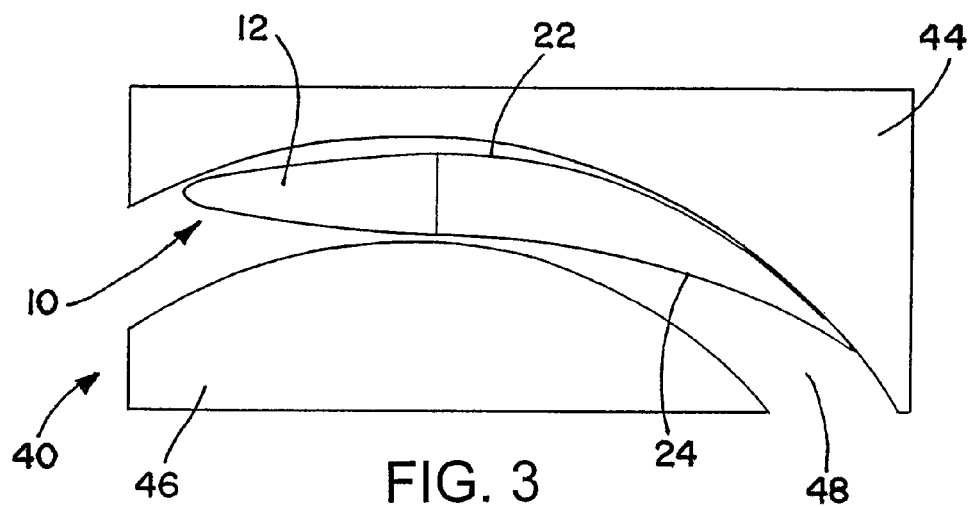
FIG. 3 is a cross-sectional view of part of an aircraft that includes the wing of FIG. 1, in a launch tube.

FIG. 2 shows the wing 10 in its stowed state. The skins 22 and 24 both curve in the same direction. With reference in addition to FIG. 3, this configuration is useful for using the wing 10 as part of an aircraft 40 that is launched from launcher 44, such as a launch tube. The launcher 44 may be used for air launching or surface launching the aircraft 40. The wing 10 is coupled to a fuselage 46 in such a way as to wrap a chord the wing 10 partially around the fuselage 46, with the fuselage 46 located within the curvature of the skins 22 and 24. This enables the wing 10 to fit better within a space 48 between the fuselage 46 and the launcher 44.

Figure 4:
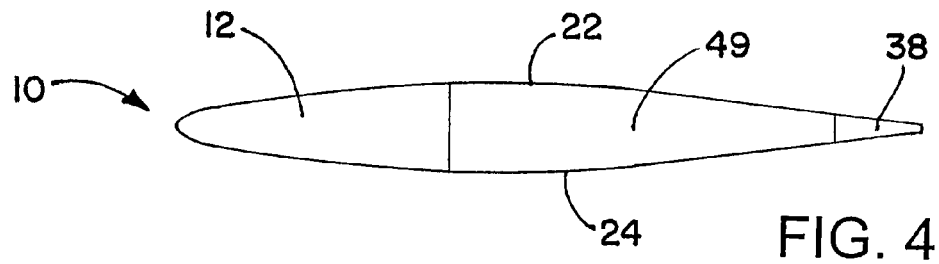
FIG. 4 is a cross-sectional view of the wing of FIG. 1, in a deployed state.

FIG. 4 shows the wing 10 in its deployed state or configuration. In the deployed state the skins 22 and 24 form an airfoil shape in conjunction with the spar 12. The shape of the wing chord changes (straightens) from what it was in the stowed state. The skins 22 and 24 may have opposite curvatures, with the inside of the curvature of the top skin 22 facing the inside of the curvature of the bottom skin 24. The skins 22 and 24 are held together, locked in place by the lock 38. In the deployed state the wing 10 forms a rigid triangular structure, the spar 12 constituting one side of the triangle, and the skins 22 and 24 constituting the other two sides of the triangle. The rigid structure formed in the deployed state can handle many times the vertical load that can be handled by the individual skins 22 and 24. The result is a strong, lightweight, and stowable wing.

The parts of the wing 10 may be made of any of a variety of suitable materials. The spar 12 may be made of a suitable high-strength low-weight material, an example of a suitable material being aluminum. The spar 12 thus may be a solid aluminum structure. The skins 22 and 24 may be made of a suitable flexible material, such as suitable composite materials, for example carbon-fiber reinforced composite materials that also include resin, epoxy, and/or plastic. An alternative material for the skins is sheet metal, such as spring steel. Skin thickness may vary with such factors as wing size (which in turn varies with vehicle size), the material the skin is made of, and also with the intended air speed for the vehicle. To give example numbers, sheet metal skins might be anywhere from about 0.76 mm (0.030 inches) to about 2.29 mm (0.090 inches) thick, although a wide range of other thicknesses are possible. If off-the-shelf epoxy-carbon fiber composite was used the thickness may be around 2.54 mm (0.100 inches) to 4.78 mm (0.188 inches) thick. Wing dimensions may also vary widely with the size and use of the vehicle. Example sizes (chord length×exposed semi-span) include (without limitation) 51 mm (2 inches)×102 mm (4 inches), and 102 mm (4 inches)×305 mm (12 inches). The skins may be attached to the spar with rivets, machine screws, and/or adhesives.

In the illustrated embodiment no material is placed in the space 49 between the skins 22 and 24. However as an alternative a flexible material, such as a spray-in foam, may be located in the space 49, for example to stabilize the skins 22 and 24 further, and to reduce unwanted deformations.

The wing 10 may be deployed in a process that not only takes it from the stowed state to the deployed state, but also rotates the wing 10 to put it into the desired orientation relative to the fuselage 46. Examples of deployment mechanisms for accomplishing the desired change in orientation are shown in co-owned U.S. Pat. Nos. 6,905,093 and 7,642,492, the descriptions and figures of which are incorporated by reference herein. Further details regarding such deployment mechanisms are omitted from further discussion.

Figure 5:
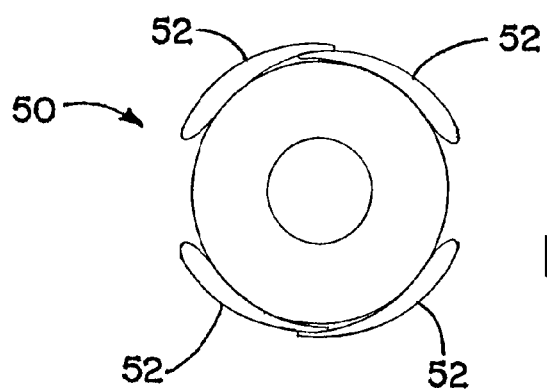
FIG. 5 is an end view of the aircraft of FIG. 3, with its wings in a stowed configuration or state.
Figure 6:
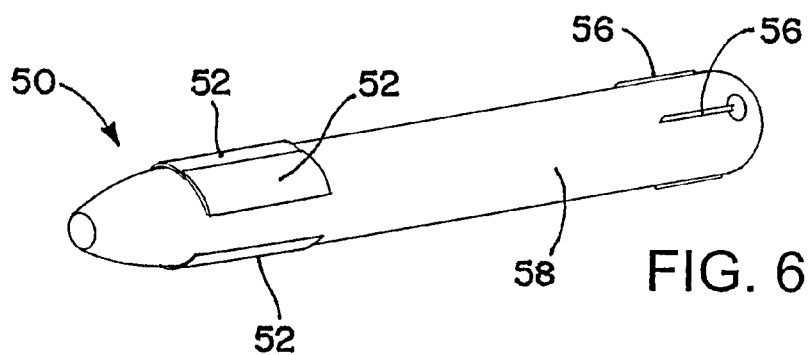
FIG. 6 is an oblique view of the aircraft of FIG. 3, with its wings in a stowed configuration or state.
Figure 7:
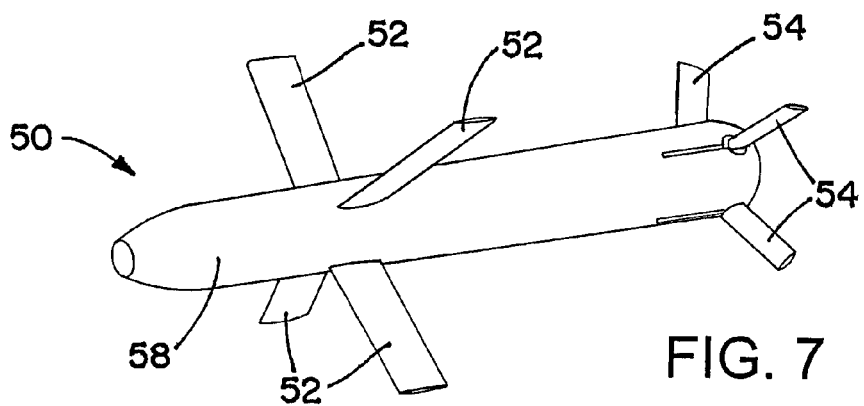
FIG. 7 is an oblique view of the aircraft of FIG. 3, with its wings in a deployed configuration or state.

FIGS. 5-7 illustrate an example of a launched missile or other aircraft 50 that includes four wings 52 that may be similar in configuration and features to the wing 10 (FIG. 1). The aircraft 50 also has tail fins 54 that deploy from slots 56 in a fuselage 58. The wings 52 overlap in pairs when in the stowed condition (FIGS. 5 and 6). In an unloaded condition the wings 52 may naturally be in the deployed condition (FIG. 7). Flexing the wings 52 to put them into the stowed condition may result in a resilient force that automatically results in the wings 52 attaining the deployed condition as soon as the aircraft 50 exits the launch tube or other launcher. The deployment mechanism for changing orientation may also be driven by resilient forces.

As an alternative, the wings 52 of the aircraft 50 may be deployed prior to launch, and/or the aircraft 50 may be launched from other than a launch container. For example the aircraft may have its wings 52 kept in the stowed state during shipping and storage in an appropriate container. The wings 52 may be deployed prior to, during, or after launch.

FIGS. 8-11 show one embodiment of the lock 38, a lock mechanism 68. The lock mechanism 68 includes an upper piece 72 and a lower piece 74, which are attached to ends of the upper skin 22 and the lower skin 24, respectively. The pieces 72 and 74 may be attached to the skins 22 and 24 through bonding or by use of suitable fasteners, such as rivets. As illustrated, the upper piece 72 has a triangular trailing edge element 76 that runs along the span of the wing 10, and a series of fingers 78 that extend forward from the triangular element 76. The fingers 78 are received in grooves 84 of the lower piece 74. The fingers 78 have lower surfaces with teeth 86 that engage correspondingly-shaped teeth 88 within the grooves 84. The teeth 86 and 88 are asymmetric teeth that engage in a ratcheting fashion to allow one-way movement of the lock mechanism 68. The teeth 86 and 88 are configured to allow the upper piece 72 to move further into engagement with the lower piece 74, with the upper piece 72 sliding against the lower piece 74, while preventing relative movement of the pieces 72 and 74 in the opposite direction. This allows the wing 10 to move from the stowed state or configuration into the deployed state or configuration. Once that happens the ratcheting engagement of the teeth 86 and 88 prevents movement in the opposite direction (from the deployed state to the stowed state). The lock mechanism 68 has the advantages of being simple, reliable, low weight and cost, and of not being prone to binding or jamming.

The pieces 72 and 74 may be made of any of a variety of suitable materials. For example the pieces 72 and 74 may be made of injection-molded thermoplastics. Alternatively the pieces 72 and 74 may be made of metal, such as steel. Metal parts have the advantage of maintaining their properties and integrity well over long periods of time, such as during long-term storage.

Figure 8:
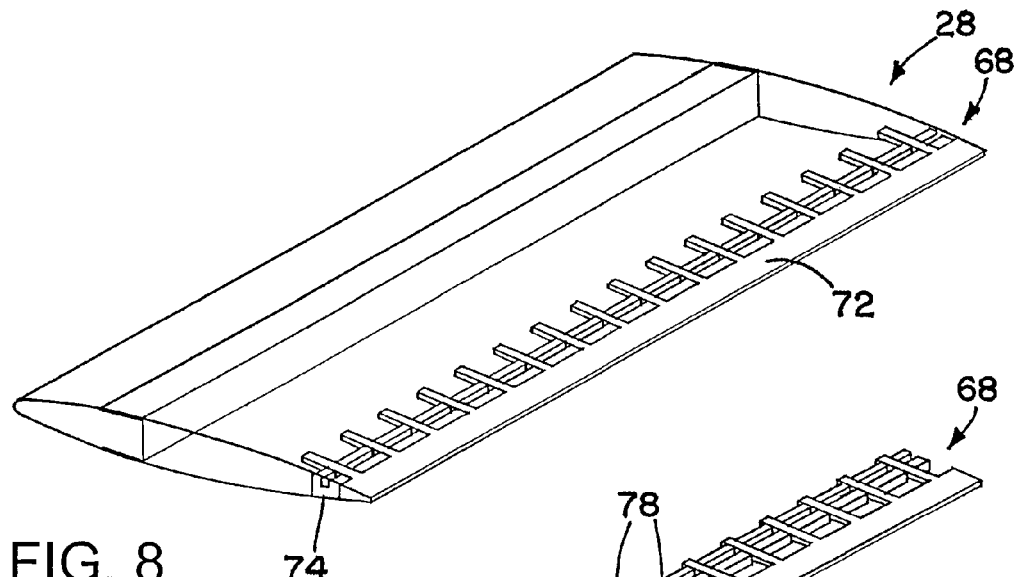
FIG. 8 is an oblique view of a wing with one embodiment of a lock in accordance with the invention.
Figure 9:
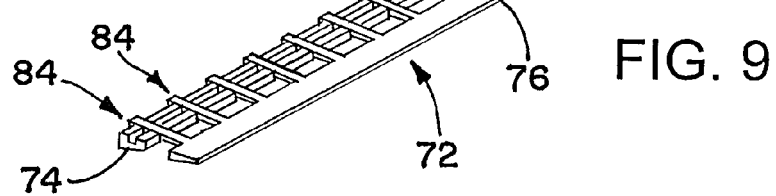
FIG. 9 is an oblique view of the lock of FIG. 8, with the lock in its position when the wing is in the stowed state.
Figure 10:
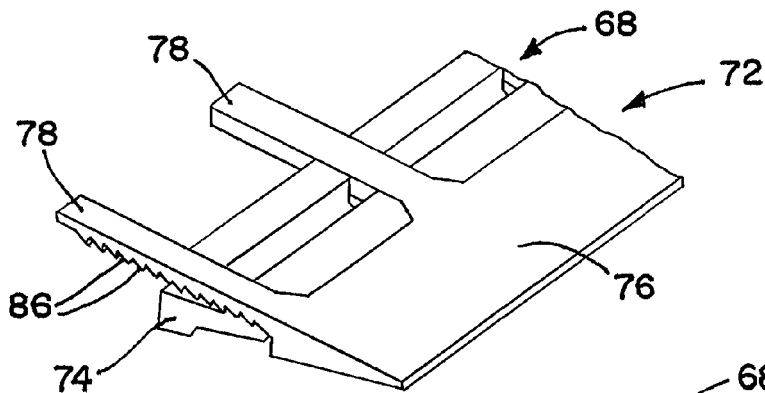
FIG. 10 is a first close-up view of the lock of FIG. 8.
Figure 11:
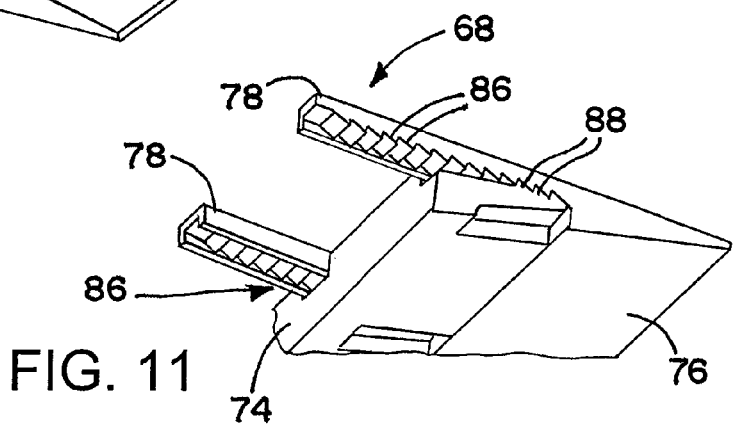
FIG. 11 is a second close-up view of the lock of FIG. 8.
Figure 12:
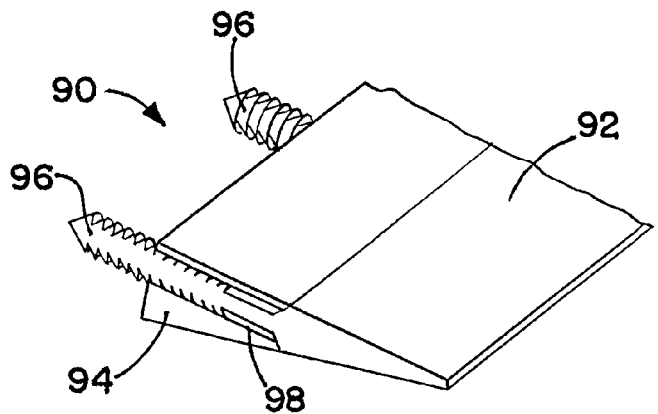
FIG. 12 is a close-up view of a first alternate embodiment of a lock that is usable with a wing, in accordance with the invention.
Figure 13:
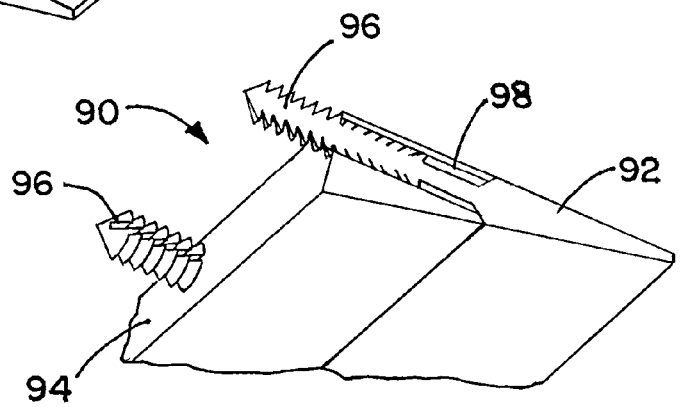
FIG. 13 is another close-up view of the lock of FIG. 12.

FIGS. 12 and 13 show another embodiment, a lock mechanism 90 that includes a first piece 92 and a second piece 94. The pieces 92 and 94 are similar to the pieces 72 and 74, except for a different sort of ratcheting engagement. The first piece 92 has barbed posts 96 with a lanciform shape. The barbs of the posts 96 engage the ends of the second piece 94 that are around holes 98 in the second piece 94 that receive the posts 96. In other respects the lock mechanism 90 may be similar to the lock mechanism 68 (FIG. 8).

Figure 14:
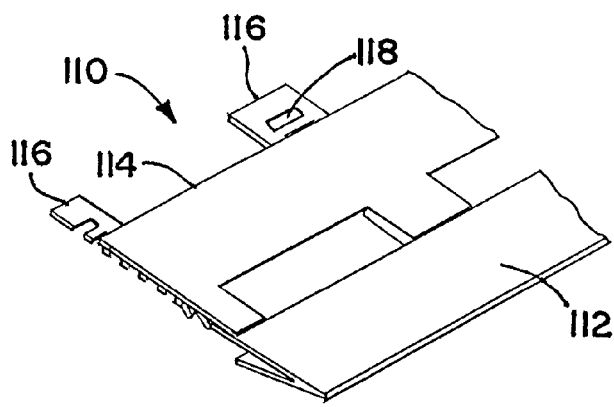
FIG. 14 is a close-up view of a second alternate embodiment of a lock that is usable with a wing, in accordance with the invention.
Figure 15:
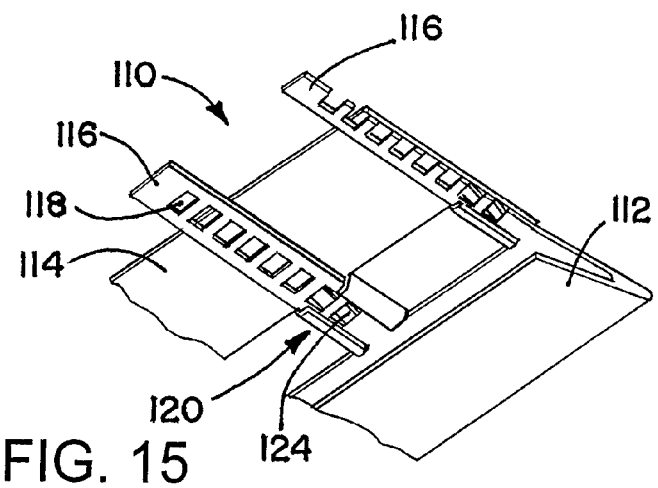
FIG. 15 is another close-up view of the lock of FIG. 14.

FIGS. 14 and 15 show a third embodiment lock mechanism 110 that includes a first piece 112 that has tabs 116 with holes 118 in them. The tabs 116 slide in corresponding slots 120 in a second piece 114. The second piece 114 has asymmetric teeth 124 that engage the slots 120 to allow the tabs 116 to slide into, but not out of, the slots 120. In other respects the lock mechanism 110 may be similar to the lock mechanism 68 (FIG. 8).

Figure 16:
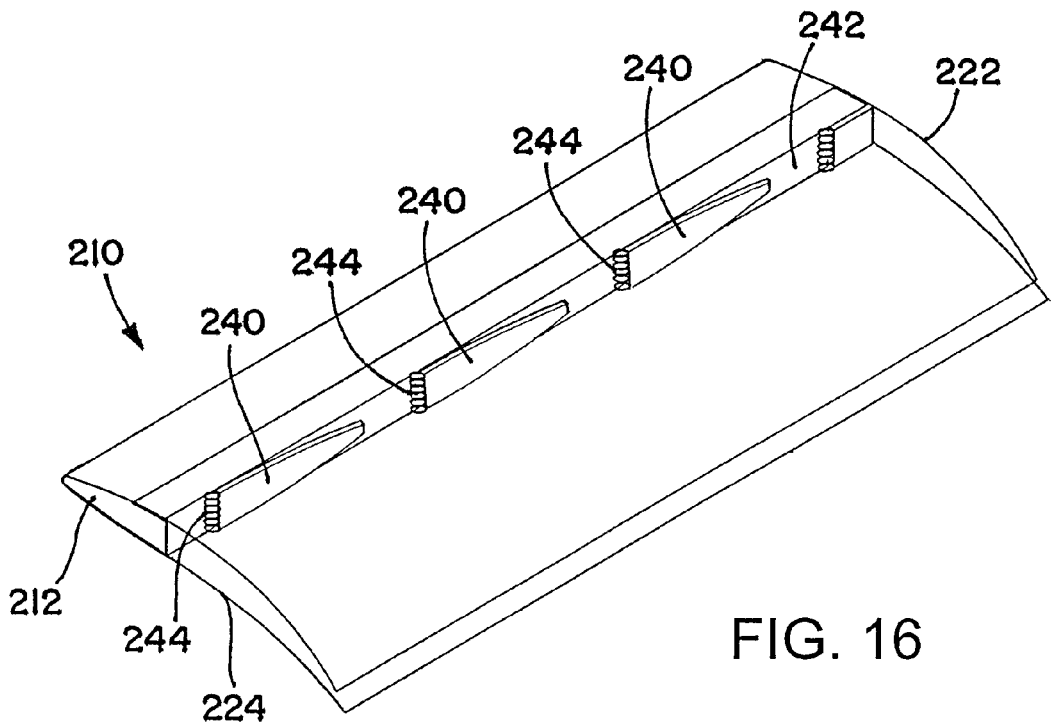
FIG. 16 is an oblique view of a wing that has ribs in accordance with an alternate embodiment of the invention, with the wing in a stowed state.
Figure 17:
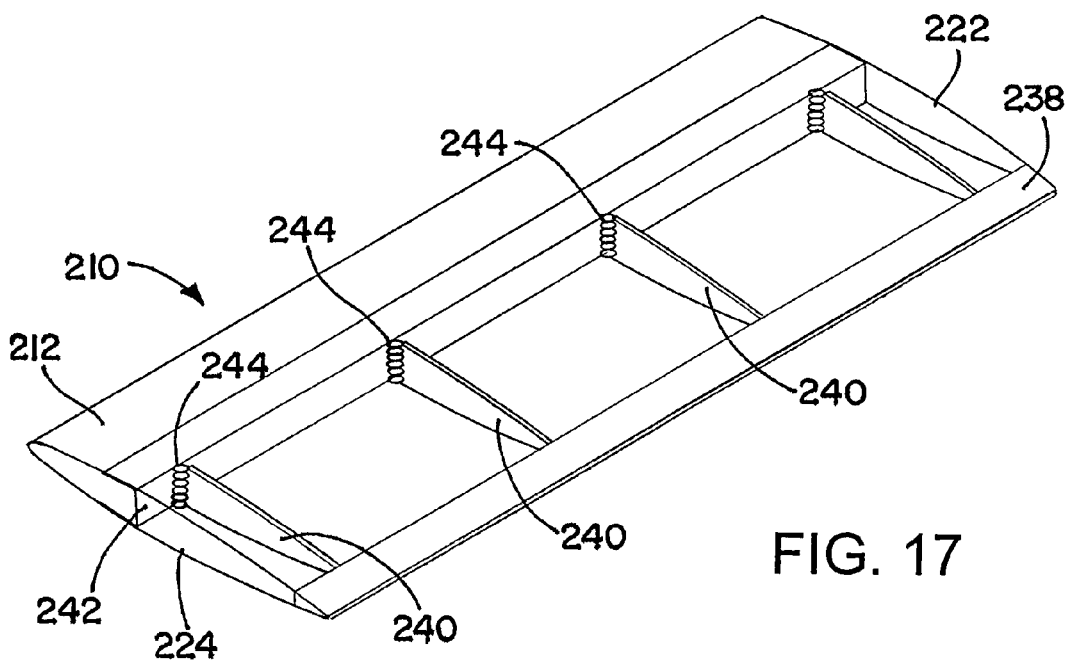
FIG. 17 is an oblique view of the wing of FIG. 16, with the wing in a deployed state, with the ribs deployed.

FIGS. 16 and 17 show an alternative embodiment wing 210 that has many features similar to those described above with regard to the wing 10 (FIG. 1): a spar 212, flexible skins 222 and 224, and a lock 238. In addition the wing 210 has a series of spring-loaded fold-out ribs 240. The ribs 240 are hingedly coupled to a back surface 242 of the spar 212, with springs 244 wrapped around the hinged connection to provide a force on the ribs 240 to extend the ribs 240 away from the spar 212. Arms at ends of the springs 244 may press against the ribs 240 and the spar back surface 242, to provide the spring force to extend the ribs 240. With the wing 210 in the stowed state (FIG. 16) the position of the top skin 222 prevents the deployment of the ribs 240. However as the wing 210 transitions to the deployed state (FIG. 17), the top skin 222 moves out of the way of the ribs 240. This allows the ribs 240 to deploy under the force of their springs, providing additional support between the top skin 222 and the bottom skin 224. The additional support from the ribs 240 may help the wing 210 retain its shape, and/or may aid in preventing deformations of the skins 222 and/or 224.

The configuration of the wings described above may allow for larger wings than could otherwise be used with a tube-launched aircraft, or an aircraft launched from another sort of launcher. The use of larger wings advantageously improves range, endurance, and/or maneuverability. For example, the wings described herein may enable a 50% extension in range relative to prior wings used for tube-launched aircraft.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A wing comprising:
 a pair of flexible skins; and
 a lock;
 in a combination with a fuselage to which the wing is coupled;
 wherein the skin portions each have a first end and a second end opposite the first end;
 wherein the first ends are spatially separated from one another by a gap;
 wherein the lock is able to selectively lock the skins together at a location that is closer to the second ends than it is to the first ends;
 wherein the lock includes a pair of lock parts that engage in a ratcheting fashion, with one of the parts having teeth, barbs, or tabs, that engage the other of the parts, allowing the wing to go from a stowed state to a deployed state, but not vice versa; and
 wherein the wing is wrapped about the fuselage when the wing is in the stowed state, with the fuselage on an inside of curves of the skins.

2. The wing of claim 1, wherein the flexible skins have opposite curvatures when the wing is in a deployed state that the wing deploys to from the stowed state.

3. The wing of claim 1, wherein the flexible skins include an upper skin and a lower skin; and wherein the lock includes an upper piece and a lower piece, which are attached to the second ends of the upper skin and the lower skin, respectively.

4. The wing of claim 1, wherein when the wing is in the stowed state the lock parts are separated by a gap;
 wherein the wing deploys from the stowed state to a deployed state in which the lock parts move further into engagement, thereby at least partially closing the gap.

5. A wing comprising:
 a pair of flexible skins; and
 a lock;
 in combination with a fuselage to which the wing is coupled;
 wherein the skins each have a first end and a second end opposite the first end;
 wherein the first ends are spatially separated from one another by a gap;
 wherein the lock is able to selectively lock the skins together at a location that is closer to the second ends than to the first ends by non-rotational sliding of one piece of the lock relative to another piece of the lock; and
 wherein the wing is wrapped about the fuselage when the wing is in a stowed state, with the fuselage on an inside of the curves of the skins.

6. The wing of claim 5, further comprising a spar to which the first ends of both of the skins are attached; wherein the spar maintains the first ends separated by the gap.

7. The wing of claim 6, wherein the spar is located at a leading edge of the wing.

8. The wing of claim 7, wherein the lock is located at a trailing edge of the wing.

9. The wing of claim 6, wherein the spar is made of aluminum.

10. The wing of claim 5, wherein the wing is initially in the stowed state in which the skins curve in the same direction; and
 wherein the wing deploys from the stowed state to a deployed state in which the skins curve in opposite directions, forming an airfoil shape.

11. The wing of claim 10, wherein in the deployed state the lock mechanically locks the skins together, maintaining the wing in the deployed state.

12. The wing of claim 5, wherein the flexible skins are made of a carbon-fiber composite material.

13. The wing of claim 5, in combination with another wing coupled to the fuselage; wherein the another wing is wrapped about the fuselage when the wing is in the stowed state; and
wherein the wings partially overlap one another when in the stowed state.

14. The wing of claim 5, wherein the flexible skins are made of sheet metal.

15. The wing of claim 5, further including a flexible material located in the gap.

16. A wing comprising:
a pair of flexible skins;
a lock; and
fold-out ribs between the skins;
in combination with a fuselage to which the wing is coupled;
wherein the skins each have a first end and a second end opposite the first end;
wherein the first ends are spatially separated from one another by a gap;
wherein the lock is able to selectively lock the skins together at a location that is closer to the second ends than it is to the first ends; and
wherein one end of each of the ribs is a free end that is not directly attached to a remainder of the wing; and
wherein the wing is wrapped about the fuselage when the wing is in a stowed state, with the fuselage on an inside of curves of the skins.

17. The wing of claim 16, further comprising a spar to which the first ends of both of the skins are attached; wherein the ribs are hinged coupled to a back surface of the spar.

18. The wing of claim 16, further including springs coupled between the ribs and the spar to enable deployment of the ribs.

19. The wing of claim 16, wherein when the wing is in the stowed state the position of one of the skins prevents the deployment of the ribs; and
wherein the wing deploys from the stowed state to a deployed state in which one of the skins moves out of the way of the ribs, allowing the ribs to deploy.

* * * * *